United States Patent
Matsumoto et al.

(10) Patent No.: US 8,243,261 B2
(45) Date of Patent: Aug. 14, 2012

(54) OPTICAL PROPERTY MEASUREMENT APPARATUS

(75) Inventors: Takeshi Matsumoto, Toyonaka (JP); Shinji Yamamoto, Sakai (JP); Kenji Imura, Toyohashi (JP); Kazuya Kiyoi, Tondabayashi (JP); Yoshiyuki Nagashima, Sakai (JP); Yasushi Goto, Sakai (JP)

(73) Assignee: Konica Minolta Sensing, Inc., Osaka (JP)

( * ) Notice: Subject to any disclaimer, the term of this patent is extended or adjusted under 35 U.S.C. 154(b) by 346 days.

(21) Appl. No.: 12/587,518

(22) Filed: Oct. 7, 2009

(65) Prior Publication Data

US 2010/0091270 A1   Apr. 15, 2010

(30) Foreign Application Priority Data

Oct. 10, 2008  (JP) .................... 2008-263733

(51) Int. Cl.
  *G01J 1/42* (2006.01)
  *G01J 3/46* (2006.01)

(52) U.S. Cl. ........ 356/220; 356/225; 356/402; 356/405; 356/419; 250/226

(58) Field of Classification Search .......... 356/213–226, 356/239, 402, 405, 419, 406, 407; 250/226, 250/239

See application file for complete search history.

(56) References Cited

U.S. PATENT DOCUMENTS 6,163,377 A * 12/2000 Boles et al. ................... 356/402
7,027,140 B2   4/2006 Slocum et al.

OTHER PUBLICATIONS

Figs. 10 and 11 in U.S. Application for "Optical Property Measurement Apparatus," Matsumoto et al., filed on Oct. 7, 2009, 1 page.

* cited by examiner

*Primary Examiner* — Hoa Pham
(74) *Attorney, Agent, or Firm* — Brinks, Hofer, Gilson & Lione

(57) ABSTRACT

An optical property measurement apparatus includes: a main body which includes a plane-shape surface that is so disposed as to face the display portion; an optical sensor which receives light directed from an opening that is formed through the plane-shape surface; and a support portion which is disposed on a side of the plane-shape surface and keeps a constant distance between the display portion and the plane-shape surface; wherein a light shield portion that is so disposed as to enclose a circumferential area of the opening of the plane-shape surface and shields entrance of light from a region other than a measurement target region of the display portion when the optical property is measured.

11 Claims, 11 Drawing Sheets

OPTICAL PROPERTY MEASUREMENT APPARATUS

This application is based on Japanese Patent Application No. 2008-263733 filed on Oct. 10, 2008 in Japan, the contents of which are hereby incorporated by reference.

FIELD OF THE INVENTION

The present invention relates to an optical property measurement apparatus that measures an optical property of a display apparatus.

DESCRIPTION OF RELATED ART

In the production process of a display apparatus, physical quantities such as brightness, chromaticity and the like of a display portion of the display apparatus are measured to measure optical properties of the display portion. For the measurement of the optical properties of the display portion, an optical property measurement apparatus that includes a sensor which faces the display portion is used.

To perform the measurement of the optical properties of the display portion of the display apparatus, it is necessary to shield the light (what is called environmental light) that becomes a disturbance and enters from outside so as to allow only the light from the display portion to enter the sensor. As a method for shielding the environment light, there is a method for measuring the optical properties by disposing the display portion (the entire display apparatus in many cases) for measuring the optical properties in a dark room. However, visibility is poor and a long time is required for the measurement in a dark room, which is costly and time-consuming for the production.

For this reason, proposed is a measurement apparatus at least part of which is brought into tight contact with the display portion to prevent environmental light from entering the sensor (e.g., U.S. Pat. No. 7,027,140). A conventional measurement apparatus is described with reference to drawings. FIG. 10 is a side view of a conventional optical property measurement apparatus, and FIG. 11 is a view of a plane-shape surface of the optical property measurement apparatus shown in FIG. 10 that faces a display apparatus. As shown in FIG. 10, an optical property measurement apparatus C includes: a main body 91; a light receiving element 92 that is a sensor which is disposed in an inner portion of an opening 911 formed through a plane-shape surface 910 of the main body 91 and measures brightness of a display portion; and a light shield portion 93 that is so disposed as to enclose a circumferential portion of the plane-shape surface 910.

In a case where a display apparatus that measures an optical property is a liquid crystal display apparatus, if a liquid crystal display portion is so pushed that pressure acts on the liquid crystal display portion, the optical property changes in the portion where the pressure acts and in its vicinity, so that it is impossible to perform accurate measurement. Accordingly, to prevent a change in the optical property due to the pressure from occurring, in the optical property measurement apparatus C shown in FIGS. 10, 11, to reduce the influence of pressure of the light shield portion 93 on the optical property, the light shield portion 93 is formed at a position away from the opening 911. Further, the light shield portion 93 includes a cushioning property. By using the light shield portion 93 that includes the cushioning property, it is possible to reduce the pressure that act on the display portion from the light shield portion 93 when the optical property measurement apparatus C is pushed against the display portion.

The display portion of the display apparatus often changes in optical properties depending on temperature. In a case where optical properties are measured by using the optical property measurement apparatus C shown in FIGS. 10, 11, the heat radiated into the space enclosed by the light shield portion 93 cannot escape, so that the air temperature in the space enclosed by the light shield portion 93 rises. Thus, the surface temperature of the display portion rises, so that it becomes difficult to accurately measure the optical properties of the display portion because of the influence of the temperature rise.

SUMMARY OF THE INVENTION

It is an object of the present invention to provide an optical property measurement apparatus capable of accurately measuring an optical property of a display portion of a display apparatus in a usual environment.

An optical property measurement apparatus according to an embodiment of the present invention is an optical property measurement apparatus that measures an optical property of a display portion of a display apparatus and includes: a main body which includes a plane-shape surface that is so disposed as to face the display portion; an optical sensor which receives light entering from an opening that is formed through the plane-shape surface; and a support portion which is disposed proximate the outer perimeter of the plane-shape surface and keeps a constant distance between the display portion and the plane-shape surface; wherein a light shield portion that is so disposed as to enclose a circumferential region of the opening of the plane-shape surface and shields entrance of light from a region other than a measurement target region of the display portion when the optical property is measured.

According to this structure, external light is shielded by the light shield portion and it is difficult for the external light which becomes a disturbance to enter the optical sensor. Besides, because it is possible to keep a constant distance between the plane-shape surface and the display portion, air easily flows and surface temperature of the display portion does not easily rise. Further, because the area of the surface of the display portion enclosed by the light shield portion is small, the amount of heat that is radiated from the display portion to the inside of the light shield portion is small, so that temperature rise of the air in the space enclosed by the light shield portion is prevented.

As described above, it is possible to prevent light which becomes a disturbance from entering the optical sensor even in a state where the display apparatus is in a usual environment and prevent rise in the surface temperature of the measurement target region where the optical property of the display portion is measured. Thus, in a usual environment, it is possible to prevent entrance of light from outside and prevent a change in the optical property of the display portion due to a temperature change, so that it is possible to accurately measure the optical property of the display apparatus.

In a preferable embodiment of the present invention, the support portion is so formed that a distance between the plane-shape surface and the display portion is larger than an inner diameter of the light shield portion in a time the optical property is measured.

In a preferable embodiment of the present invention, the measurement of the optical property is performed with the display portion upright. Here, when the measurement of the property is performed, the plane-shape surface is disposed on at least one of left and right ends, and includes a light shield wall portion that shields light which passes thorough between the plane-shape surface and the display portion is disposed.

In a preferable embodiment of the present invention, the light shield wall portion is out of contact with the display portion when the measurement of the property is performed. Besides, part or the whole of the light shield wall portion may be used as the support portion.

In a preferable embodiment of the present invention, the support portion is so formed that a distance between the plane-shape surface and the display portion is 15 mm or longer in the time the measurement of the property is performed.

In a preferable embodiment of the present invention, a tip end of the support portion includes a cushion portion that is capable of dispersing force by being deformed. According to this structure, pressure that acts from the support portion is reduced, so that it is possible to prevent the surface of the display portion from being damaged by the pressure from the support portion. Besides, it is possible to prevent a change in the optical property of the liquid crystal panel from occurring because of the pressure, and it is all the more possible to accurately measure the optical property.

In a preferable embodiment of the present invention, the light shield portion is so formed that the tip end of the light shield portion comes into contact with the surface of the display portion when the cushion portion of the support portion is pushed against the display portion to be deformed. According to this structure, because the support portion receives the pushing force, the light shield portion is not strongly pushed against the display portion, so that the surface of the display portion is prevented from being damaged. Besides, the pressure from the light shield portion to the liquid crystal panel is reduced, so that it is possible to prevent a change in the optical property from occurring because of the pressure and accurately measure the optical property.

In a preferable embodiment of the present invention, the light shield portion includes a cushion portion on a tip end thereof which is capable of dispersing force by being deformed. The cushion portion on the tip end of the light shield portion is higher in a capability to disperse force than the cushion portion on the tip end of the support portion.

In a preferable embodiment of the present invention, the display portion is a liquid crystal panel or a plasma display panel.

DESCRIPTION OF THE PREFERRED EMBODIMENTS

Figure 1:
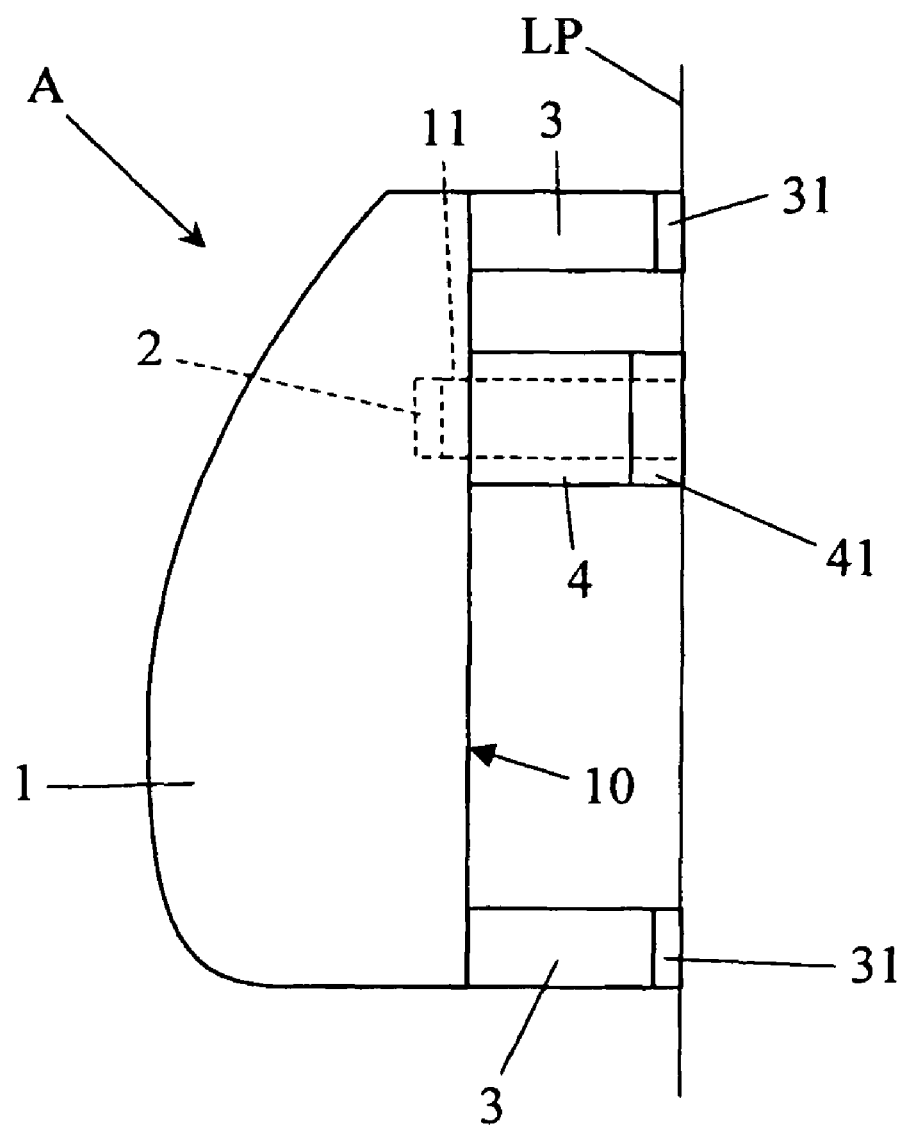
FIG. 1 is a schematic side view of a state where measurement is performed by using an optical property measurement apparatus according to the present invention.
Figure 2:
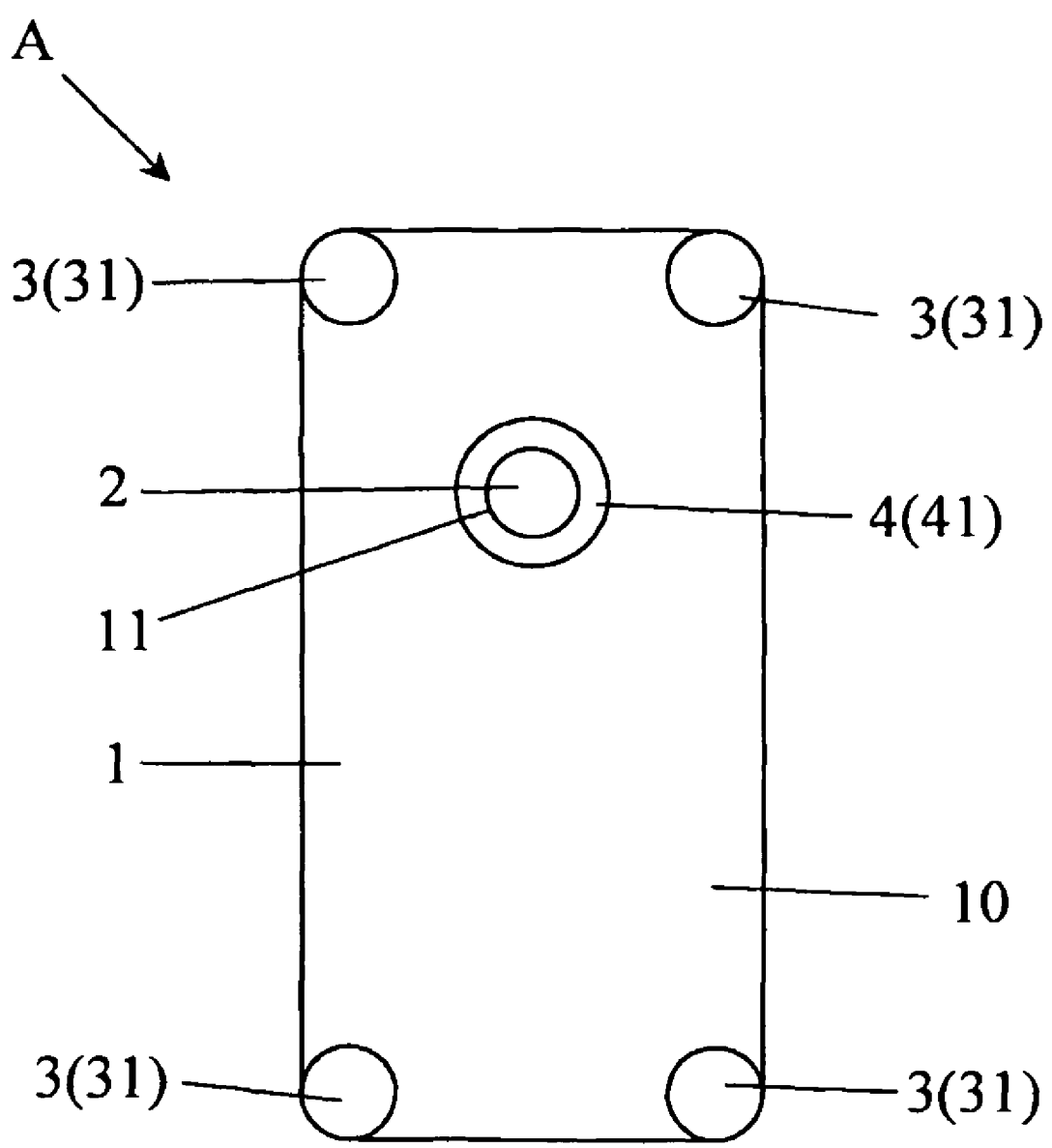
FIG. 2 is a view of a plane-shape surface that faces a display portion in the optical property measurement apparatus shown in FIG. 1.
Figure 3:
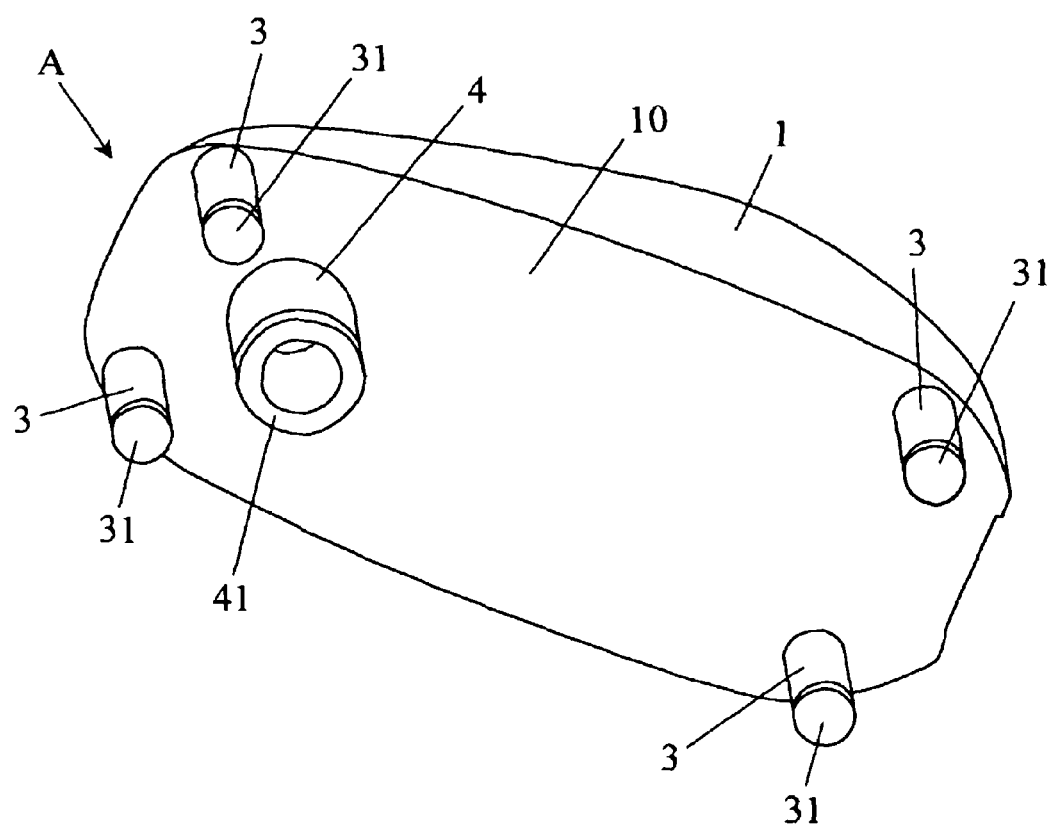
FIG. 3 is a perspective view seen from a plane-shape surface side of the optical property measurement apparatus shown in FIG. 1.

Hereinafter, embodiments of the present invention are described with reference to the drawings. FIG. 1 is a schematic side view of a state where measurement is performed with an optical property measurement apparatus according to the present invention; FIG. 2 is a view of a plane-shape surface that faces a display portion in the optical property measurement apparatus shown in FIG. 1; and FIG. 3 is a perspective view seen from a plane-shape surface side of the optical property measurement apparatus shown in FIG. 1. In the following embodiments, as an example of the display portion whose property is measured, a liquid crystal panel used for a liquid crystal display apparatus is described.

As shown in FIG. 1, an optical property measurement apparatus A is pushed against an upright liquid crystal panel LP and measures an optical property of the liquid crystal panel LP. As shown in FIGS. 1 to 3, the optical property measurement apparatus A includes: a main body 1 which has a plane-shape surface 10 that faces the liquid crystal panel LP is rectangular; a light receiving element 2 which is an optical sensor that is disposed in the inside of an opening 11 formed through the plane-shape surface 10 of the main body 1 and measures an optical property; four support portions 3 disposed at four corners of the rectangular plane-shape surface 10; and a light shield portion 4 that is so disposed as to enclose the opening 11 of the plane-shape surface 10.

The light receiving element 2 is an optical sensor for measuring brightness which is one of the optical property values of the liquid crystal panel LP. Note that besides brightness, as optical properties of the liquid crystal panel, chromaticity, response speed, contrast and the like may be measured. Besides, the light receiving element 2 may measure these optical property values or a plurality of optical property values including optical property values other than these property values at the same time.

All of the four support portions 3 have the same length. A tip end of the support portion 3 is provided with a cushion portion 31 that is formed of a material capable of dispersing force. The support portion 3 is disposed away from the light shield portion 4. The light shield portion 4 has a cylindrical shape which has substantially the same inner diameter as the inner diameter of the opening 11 and is formed of a material (e.g., a black resin material or the like) which does not easily transmit light. Note that the light shield portion 4 is not limited to a cylindrical shape and able to widely employ shapes which are capable of surely shielding light. Like the support portion 3, a tip end of the light shield portion 4 is provided with a cushion portion 41 which is capable of dispersing force.

A state where an optical property of a liquid crystal panel which is an example of a display portion of a display apparatus is measured by using the optical property measurement apparatus A according to the present invention is described with reference to drawings.

The optical property measurement apparatus A measures brightness with the plane-shape surface 10 faced with the liquid crystal panel LP. So that the plane-shape surface 10 of the main body 1 becomes parallel with the liquid crystal panel LP and a predetermined length between the plane-shape surface 10 and the liquid crystal panel LP is maintained, the optical property measurement apparatus A is supported by the four support portions 3. Here, the cushion portion 41 formed on the tip end of the light shield portion 4 comes into contact with the liquid crystal panel LP to enclose a measurement target region of the liquid crystal panel LP, thereby preventing a gap from being formed between the cushion portion 41 and the liquid crystal panel LP. Thus, external light is prevented from entering the inside of the cylinder of the light shield portion 4 through a gap between the cushion portion 41 and the liquid crystal panel LP.

The cushion portions 31, 41 disperse force in a time the optical property measurement apparatus A is pushed against the liquid crystal panel LP and reduces pressure which acts on the liquid crystal panel LP. Thus, it is possible to prevent the surface of the liquid crystal panel LP from being damaged, and prevent a change in the optical property (brightness) of the liquid crystal panel LP from occurring because of the pressure which acts on the liquid crystal panel LP from the cushion portions 31 and 41, so that it is possible to accurately measure the optical property (brightness).

The light shield portion 4 encloses the measurement target region where the brightness of the liquid crystal panel LP is measured, and the influence of the pressure due to the pushing on the brightness is great compared with the support portion 3. Accordingly, as the cushion portion 41 disposed on the tip end of the light shield portion 4, by using a cushion portion 41 which is softer (easier to disperse force) than the cushion portion 31 disposed on the tip end of the support portion 3, the pressure which acts on the surface of the measurement target region of the liquid crystal panel LP is reduced. Note that it is also possible to reduce the pressure which acts on the measurement target region by forming a large thickness of the cushion portion 41 in the direction in which the pressure acts with the softness of the cushion portion 41 identical to that of the cushion portion 31. Both softness and thickness may be different. Here, the light shield portion 4 is so formed as to have a predetermined length regardless of the thickness of the cushion portion 41.

Besides, the length of the light shield portion 4 may be so formed shorter than the support portion 3 that the cushion portion 41 comes into contact with the liquid crystal panel LP when the cushion portion 31 is deformed to some extent. According to such formation, it is possible to reduce the pressure which acts on the liquid crystal panel LP from the cushion portion 41 when the cushion portion 41 comes into contact with the liquid crystal panel LP. The pressure which acts on the liquid crystal panel LP from the cushion portion 31 becomes high; however, because the cushion portion 31 is away from the measurement target region, the influence of the pressure on the brightness is so small that it is possible to prevent the accuracy of measured values of the brightness of the measurement target region from dropping.

To push the optical property measurement apparatus A against the liquid crystal LP, a conventionally well-known method is used. For example, it is possible to employ methods widely such as a method which uses the self-weight of the optical property measurement apparatus A, a method in which a belt having elastic force is wound around the liquid crystal panel LP and the pushing is performed with the aid of the elastic force of the belt, a method for pushing the optical property measurement apparatus A which is fixed with a jig against the liquid crystal panel LP, and a method capable of pushing the optical property measurement apparatus A against the liquid crystal panel LP with a predetermined force.

Figure 4:
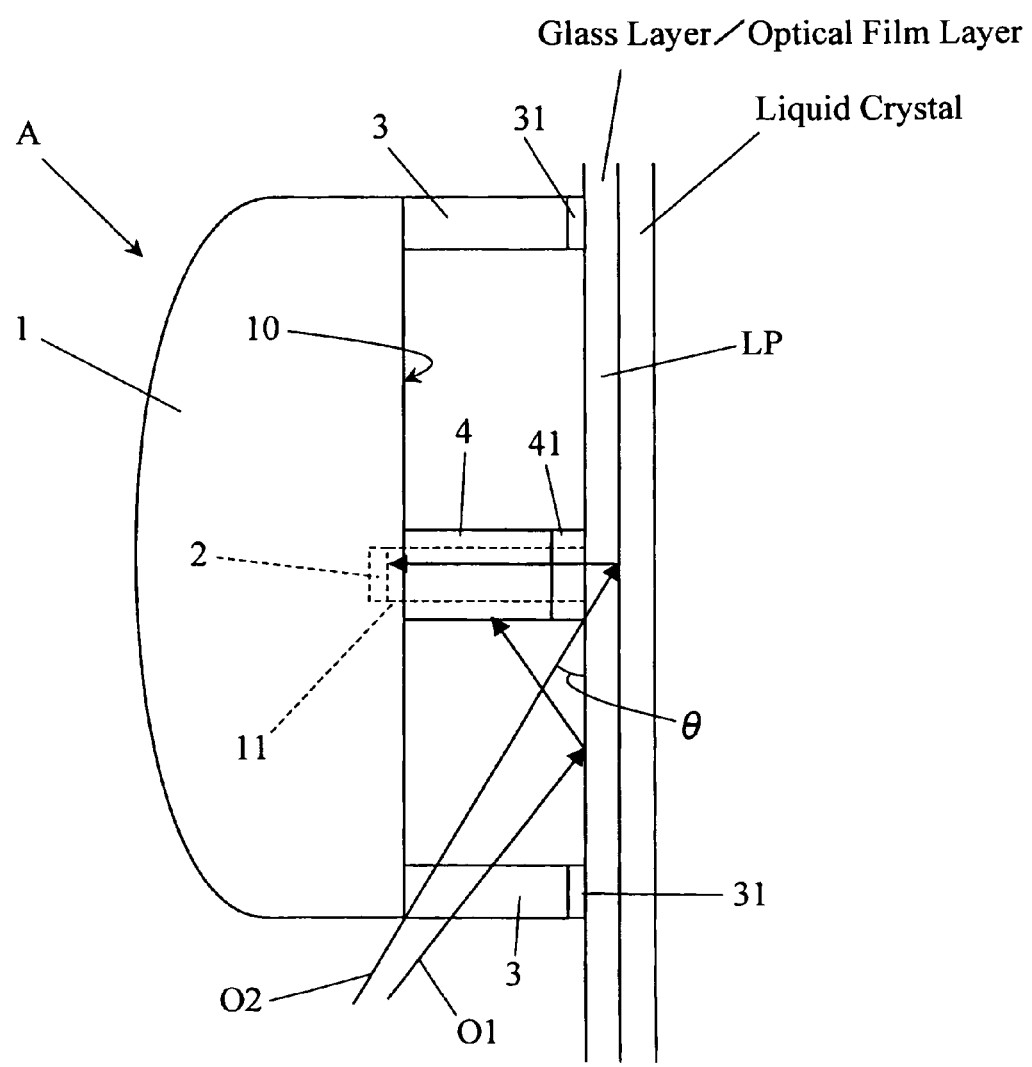
FIG. 4 is a view showing an incident state of environmental light from outside seen from over in a state where an optical property measurement apparatus is used.

The influence of environmental light from outside on the light receiving element in a time the optical property measurement apparatus A is mounted on the liquid crystal LP is described with reference to a drawing. FIG. 4 is a view showing an incident state of environmental light seen from over in a state where the optical property measurement apparatus is used. As shown in FIG. 4, environmental light enters a gap between the plane-shape surface 10 of the main body 1 and the liquid crystal panel LP. As indicated by a light path O1, much of the environmental light is reflected by the surface of the liquid crystal panel LP, is shielded by the light shield portion 4 and does not reach the light receiving element 2.

On the other hand, as indicated by a light path O2, if light enters a region (the measurement target region) of the liquid crystal panel LP which is opposite to the light receiving element 2, the entering light is reflected to be diffused by an optical film layer and by the boundary between a glass layer and the optical film layer. Thus, part of the light entering the light path O2 can reach the light receiving element 2. The larger the angle θ of the light path O2 to the surface of the liquid crystal panel LP is, the more the amount of light entering the light receiving element 2 becomes. And, because the distance from the side end of the plane-shape surface 10 to the opening 11 (the measurement target region) is short, the angle θ of light path O2 for the light entering from the side of the optical property measurement apparatus A becomes large.

Figure 5:
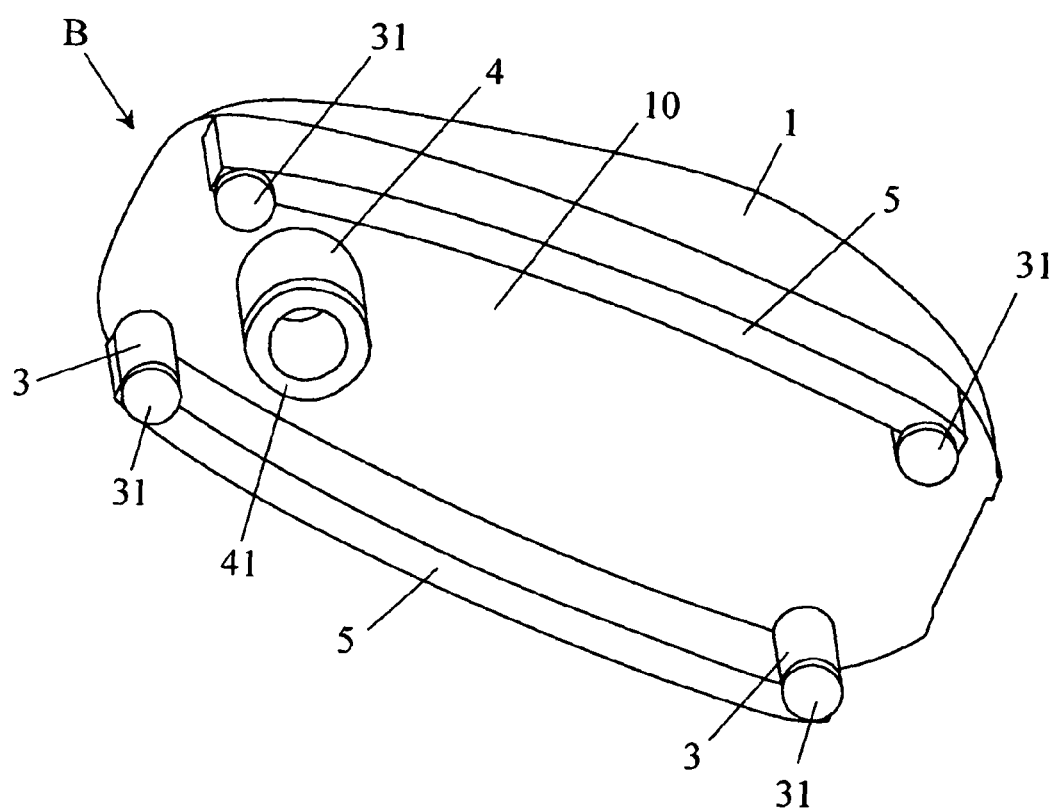
FIG. 5 is a perspective view of another example according to the present invention seen from a plane-shape surface side.

Accordingly, in the optical property measurement apparatus according to the present invention, as described below, an additional light shield portion which shields the light that enters from the side through the light path O2 is employed. Another example of the optical property measurement apparatus according to the present invention is described with reference to a drawing. FIG. 5 is a perspective view of another example according to the present invention seen from a plane-shape surface side. An optical property measurement apparatus B shown in FIG. 5 is obtained by providing a light shield wall portion 5, that is, an additional light shield portion, to the optical property measurement apparatus A shown in FIG. 3. The other portions have the same structures as those of the optical property measurement apparatus A; substantially the same portions are indicated by the same reference numbers and a detailed description of substantially the same portions are skipped.

As shown in FIG. 5, in the optical property measurement apparatus B, as for the distance between the end of the plane-shape surface 10 and the opening 11, the horizontal distance is shorter than the vertical distance when the optical property measurement apparatus B is mounted on the liquid crystal panel LP. Accordingly, the angle θ of the external light which enters through the light path O2 (see FIG. 4) from both left and right sides becomes larger than the angle θ of the external light which enters through the light path O2 from upward and downward directions. The more the amount of the external light which enters from both left and right sides becomes, the amount of the external light which enters the light receiving element 2 also increases, so that an accurate measurement becomes difficult to perform. Accordingly, in the optical property measurement apparatus B, to prevent the entrance of environmental light from both left and right sides, the light shield wall portions 5 are formed.

The light shield wall portions 5 are members which protrude from both left and right ends of the plane-shape surface 10 in the same direction as the support portion 3. The length of the light shield wall portion 5 in the protrusion direction is shorter than the length of the support portion 3. Besides, when the optical property measurement apparatus B is pushed against the liquid crystal panel LP to measure the brightness of the liquid crystal panel LP (in other words, when the cushion portion 31 of the support portion 3 is pushed against the liquid crystal panel LP with a predetermined force), the protrusion amount of the light shield wall portion 5 beyond the plane-shape surface 10 is so large as to be close to or come into contact with the surface of the liquid crystal panel LP. Thus, it is possible to prevent the light entrance from both left and right sides when the optical property measurement apparatus B is pushed against the liquid crystal panel LP. Besides, because the light shield wall portion 5 comes close to or into contact with the liquid crystal panel LP when the optical property measurement apparatus B is pushed against the liquid crystal panel LP, it is possible to prevent the surface of the liquid crystal panel LP form being damaged.

On the other hand, the liquid crystal panel LP has a property that the optical property varies depending temperature change. In many cases, a liquid crystal display apparatus which uses the liquid crystal panel LP as a display portion includes a backlight, and heat from the backlight is transmitted to the liquid crystal panel LP. In a usual use state of the liquid crystal display apparatus, because the heat transmitted to the liquid crystal panel LP is radiated to outside from the surface of the liquid crystal panel LP, temperature rise of the surface of the liquid crystal panel LP is prevented and does not give great influence to the optical property. However, in the time the optical property of the liquid crystal panel LP is measured by using the optical property measurement apparatus because the light shield portion 4 comes into contact with the liquid crystal panel LP and because the main body 1 also comes close to the liquid crystal panel LP, it is hard for the heat to escape from the surface of the liquid crystal panel LP and the optical property easily changes under the influence of the heat.

Figure 6:
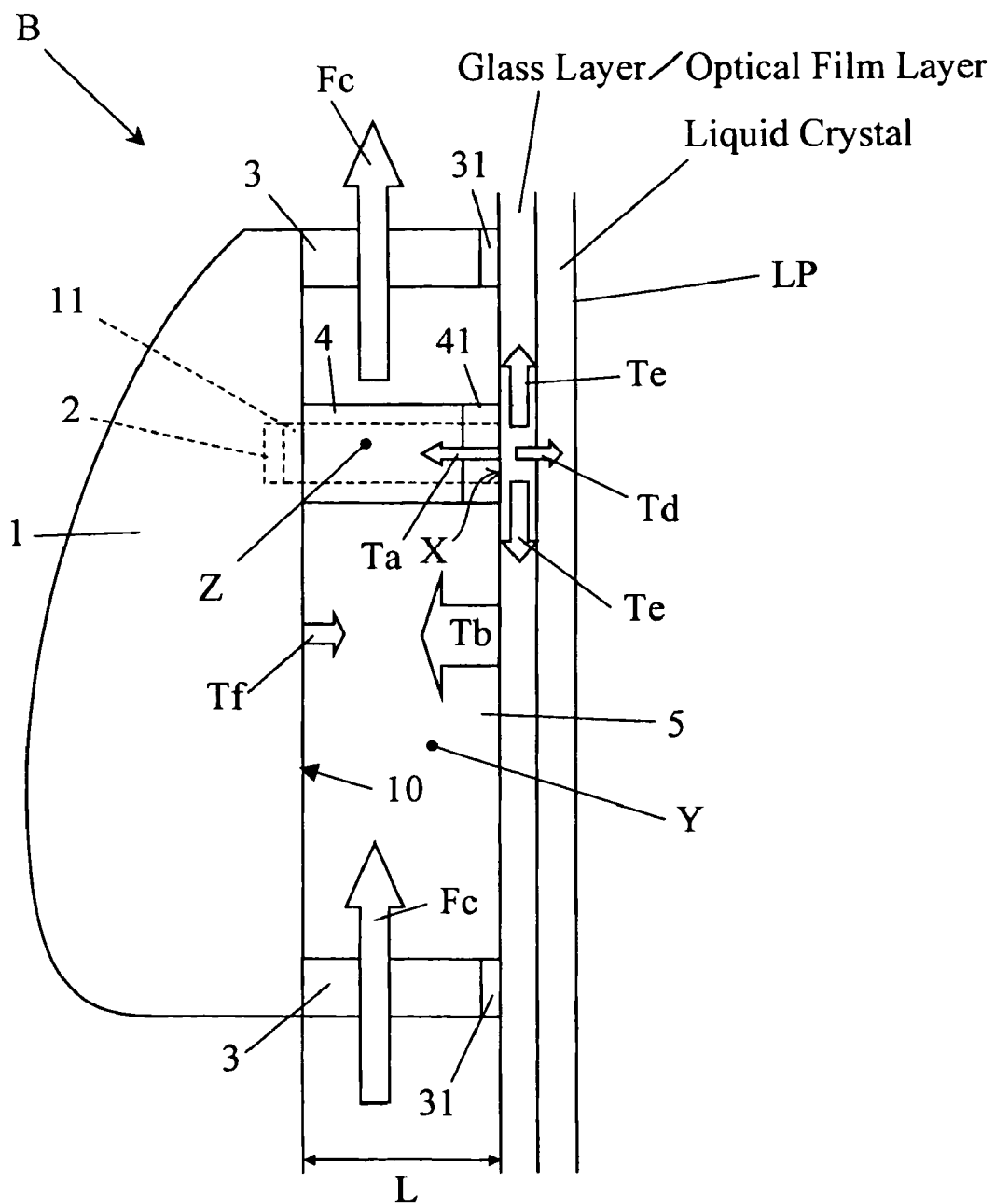
FIG. 6 is a side view showing heat transfer in a state where brightness of a liquid crystal panel is measured by using the optical property measurement apparatus shown in FIG. 5.

The influence of heat in the time the optical property is measured by using the optical property measurement apparatus according to the present invention is described. Heat transfer on the surface of the liquid crystal panel LP in a state where the brightness of the liquid crystal panel LP is measured by using the optical property measurement apparatus B is described with reference to a drawing. FIG. 6 is a side view showing heat transfer in a state where the brightness of the liquid crystal panel is measured by using the optical property measurement apparatus shown in FIG. 5. FIG. 6 shows heat transfer in the measurement state by using arrows. Here, in the example shown in FIG. 6, the description is performed by using the optical property measurement apparatus B. However, the same heat transfer occurs in a state as well where the optical property measurement apparatus A shown in FIG. 3 is used.

The heat from the liquid crystal panel LP is radiated from the surface into the air. As shown in FIG. 6, in the state where the optical property measurement apparatus B is mounted on the liquid crystal panel LP, partial heat Ta of the heat radiated from the surface of the liquid crystal panel LP is radiated into a space Z in the inside of the light shield portion 4 and the remaining heat Tb (most of the heat from the liquid crystal panel LP) is radiated into a space Y which is not enclosed.

Because the heat Ta is radiated form the surface of the liquid crystal panel LP into the space Z in the inside of the light shield portion 4, the temperature of the air in the inside of the space Z rises. Because of the temperature rise (heat is stored) of the air in the inside of the space Z, heat Td is transmitted from the space Z to a measurement target region X of the surface of the liquid crystal panel LP which is enclosed by the cushion portion 41 of the light shield portion 4. Partial heat Te of the heat Td is diffused in a direction along the surface of the liquid crystal panel LP.

On the other hand, between the optical property measurement apparatus B and the surface of the liquid crystal panel LP, air is warmed by heat radiated from the liquid crystal panel LP to generate an ascending air current Fc. Because the heat Tb is carried by the ascending air current Fc, the temperature rise of the liquid crystal panel LP is not easily subjected to the influenced by the heat Tb. Here, when the optical property measurement apparatus B is mounted on the liquid crystal panel LP, the light shield wall portions 5 are disposed on both left and right sides and extend vertically, and does not easily influence the generation and flow of the ascending air current Fc and the temperature rise of the liquid crystal panel LP as well.

Besides, part of the heat Tb radiated from the liquid crystal panel LP is absorbed by the plane-shape surface 10 of the main body 1 and the temperature of the plane-shape surface 10 rises. Because of the temperature rise of the plane-shape surface 10, radiation heat is generated; the air temperature of the space Y raises and the temperature of the liquid crystal panel LP rises. In addition, part of the heat radiated from the liquid crystal panel LP to the plane-shape surface 10 is reflected as heat Tf which returns to the liquid crystal panel LP and raises the surface temperature of the liquid crystal panel LP.

In the time the brightness of the liquid crystal panel LP is measured by using the optical property measurement apparatus B, the following heat transfer is predicted. To prevent the influence of the heat of the liquid crystal panel LP from impinging on the brightness, it is necessary to prevent rise in the surface temperature of the measurement target region X of the liquid crystal panel LP enclosed by the light shield portion when the optical property measurement apparatus B is disposed.

To prevent temperature rise of the measurement target region X of the liquid crystal panel LP, temperature rise of the air in the space Z needs to be prevented. A method for preventing temperature rise of the air in the inside of the space Z is to reduce the amount of the heat Ta and increase the air amount in the space. Because the heat Ta increase in proportion to the area of the measurement target region X, it is possible to reduce the amount of the heat Ta transmitted to the air in the space Z by decreasing the area of the measurement target region X. Besides, it is possible to enlarge the volume of the space Z by lengthening the light shield portion 4, that is, lengthening the distance between the plane-shape surface 10 and the liquid crystal panel LP. Thus, it is possible to reduce the heat amount per volume transmitted to the air in the space Z, so that it is possible to prevent temperature rise of the air in the space Z.

In addition, if the light shield portion 4 becomes long, an area with which the ascending air current Fc collides increases. Thus, an area through which the ascending air current Fc flows along the light shield portion 4 increases, so that the amount of heat removed from the light shield portion 4 by the ascending air current Fc increases. Thus, the amount of heat in the space Z which is radiated to outside also increases, so that temperature rise of the air in the space Z is prevented.

Moreover, to reduce the heat Tf which is reflected by the plane-shape surface 10, a member which does not easily reflect heat may be mounted on the plane-shape surface 10. It is possible to prevent temperature rise of the surface of the liquid crystal panel LP by preventing heat reflection by the plane-shape surface 10. Here, as the member attached to the plane-shape surface 10, a member which does not easily reflect and radiate heat is preferable. As the member attached to the plane-shape surface 10, a sheet formed of a black resin material or a heat radiation sheet which easily absorbs heat and transfers heat to another member is also used.

Specific examples of the optical property measurement apparatus according to the present invention are described based on experimental data.

Experiment 1

Figure 10:
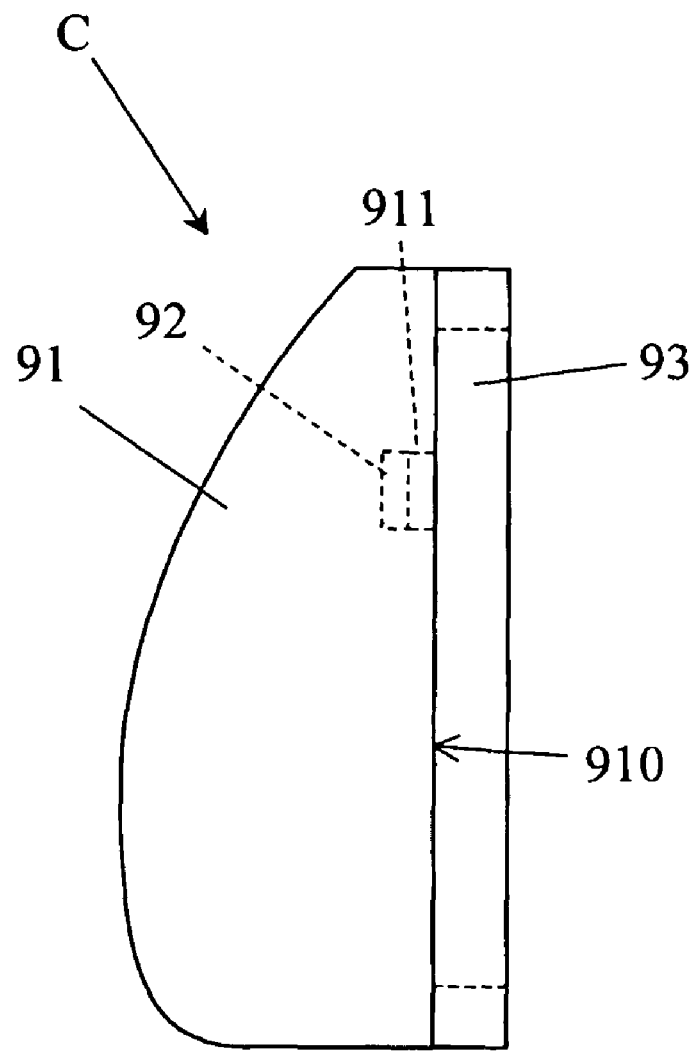
FIG. 10 is a side view of a conventional optical property measurement apparatus.
Figure 11:
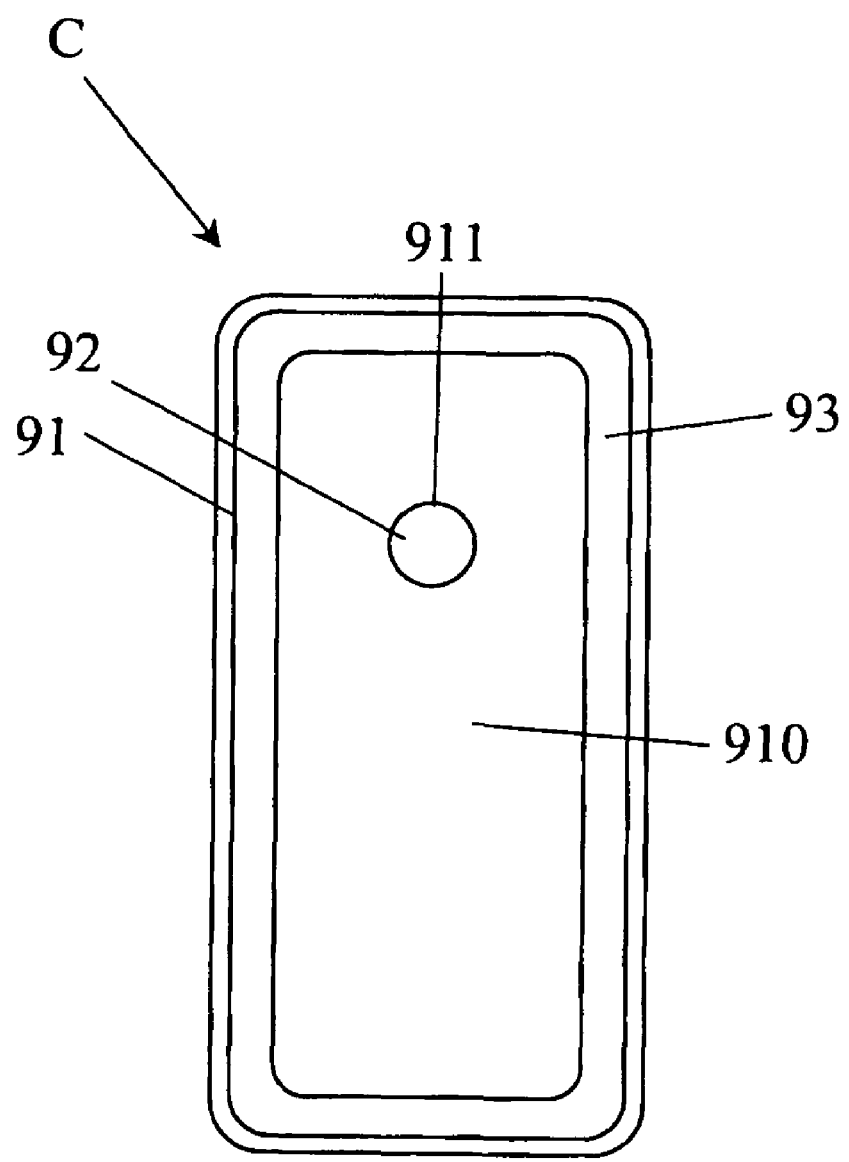
FIG. 11 is a view of a plane-shape surface of the optical property measurement apparatus shown in FIG. 10.

The temperature change of the surface of the liquid crystal panel LP in the time the optical property measurement apparatus according to the present invention is used is compared with the temperature change in the time the conventional optical property measurement apparatus is used. As an experimental sample, the optical property measurement apparatus B which is supported by the four support portions 3, includes the light shield portion 4 and the light shield wall portions 5 on both left and right sides is used. Besides, as a comparison sample, the conventional optical property measurement apparatus C (see FIGS. 10, 11) which includes the light shield portion 93, arranged on circumferential region of the plane-shape surface 910, for enclosing the plane-shape surface 910, and covers the surface of the measurement target region of the liquid crystal panel by using the plane-shape surface 910 of the main body 91 and the light shield portion 93 is used. Here, the distance L between the liquid crystal panel and the plane-shape surface is 30 mm in common, and the light shield portion 4 of the optical property measurement apparatus B is a member which has an outer diameter of 20 mm and an inner diameter of 15 mm.

In the time the measurement is performed by using the optical property measurement apparatus B, the surface temperature of the measurement target region of the liquid crystal panel LP rises 2° C. and the change rate of the brightness is 2.5%. It is understood that by using the optical property measurement apparatus B, the temperature rise is prevented and it is possible to curb low the change rate of the brightness due to the temperature rise. Usually, in many cases, the degree of certainty of an optical property measurement apparatus (a sensor) which measures an optical property of a display portion of a liquid crystal display apparatus is about 2% in the change rate of brightness. In the case where the optical property measurement apparatus B is used, the change rate of the brightness falls within the degree of certainty of the sensor, and the measurement accuracy (the reliability of measured values) is prevented from dropping.

On the other hand, in the time the measurement is performed by using the conventional optical property measurement apparatus C, the surface temperature of the measurement target region of the liquid crystal panel LP rises 7° C. and the change rate of the brightness is 8.0%. In the case where the conventional optical property measurement apparatus is used, it is understood that the change rate of the brightness excessively exceeds the degree of certainty of the sensor, and the measurement accuracy (the reliability of measured values) dramatically drops.

Experiment 2

The distance L between the liquid crystal panel LP and the plane-shape surface 10 in the time the brightness of the liquid crystal panel LP is measured by using the optical property measurement apparatus B according to the present invention is studied. As described above, because the size of the space Z changes depending on the distance between the liquid crystal panel LP and the plane-shape surface 10 of the main body 1, it is predicted that if the distance L between the liquid crystal panel LP and the plane-shape surface 10 changes, the surface temperature of the measurement target region X changes. Accordingly, in the experiment 2, experiments are performed for five different distances of 5 mm, 10 mm, 15 mm, 20 mm, and 30 mm between the plane-shape surface 10 and the liquid crystal panel LP. Here, because the experiments are for studying relationships between the distance from the plane-shape surface 10 to the surface of the liquid crystal panel LP and the surface temperature of the liquid crystal panel LP, for convenience, the experiments are performed with the light shield portion 4 not mounted. However, it is predictable that even if the light shield portion 4 is mounted, the same property appears.

Figure 7:
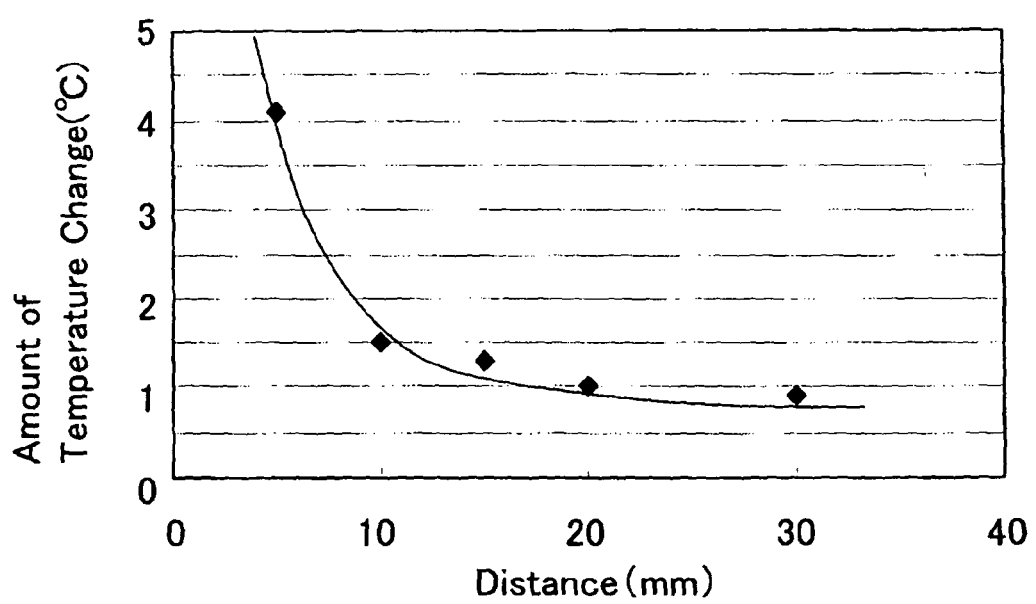
FIG. 7 is a graph showing a relationship between distance from a liquid crystal panel to a plane-shape surface and amount of temperature change.

FIG. 7 is a graph showing a relationship between the distance from the liquid crystal panel to the plane-shape surface and temperature change. Here, in the graph shown in FIG. 7, the lateral axis indicates the distance (mm) between the liquid crystal panel and the plane-shape surface, while the vertical axis indicates an amount of temperature change (° C.) of the liquid crystal panel. The amount of temperature change is a difference between the surface temperature of the liquid crystal panel with the optical property measurement apparatus not pushed and the surface temperature with the optical property measurement apparatus pushed.

As shown in FIG. 7, the longer the distance between the liquid crystal panel LP and the plane-shape surface 10 becomes, the smaller the amount of temperature change of the measured region becomes. Specifically, it is understood that the amount of temperature change reduces from 4.1° C. for a distance of 5 mm between the liquid crystal panel LP and the plane-shape surface 10 to 1.5° C. for 10 mm, 1.3° C. for 15 mm, 1° C. for 20 mm and 0.9° C. for 30 mm. Besides, it is understood that while the amount of temperature change sharply changes between 5 mm and 15 mm, the amount of temperature change becomes smaller for 15 mm or longer. From these results, obtained is a piece of knowledge that if the production is so performed as to set a distance of 15 mm between the surface of the liquid crystal panel LP and the plane-shape surface 10 of the main body 1, it is possible to prevent a change in the temperature and a drop in the measurement accuracy from occurring.

Figure 8:
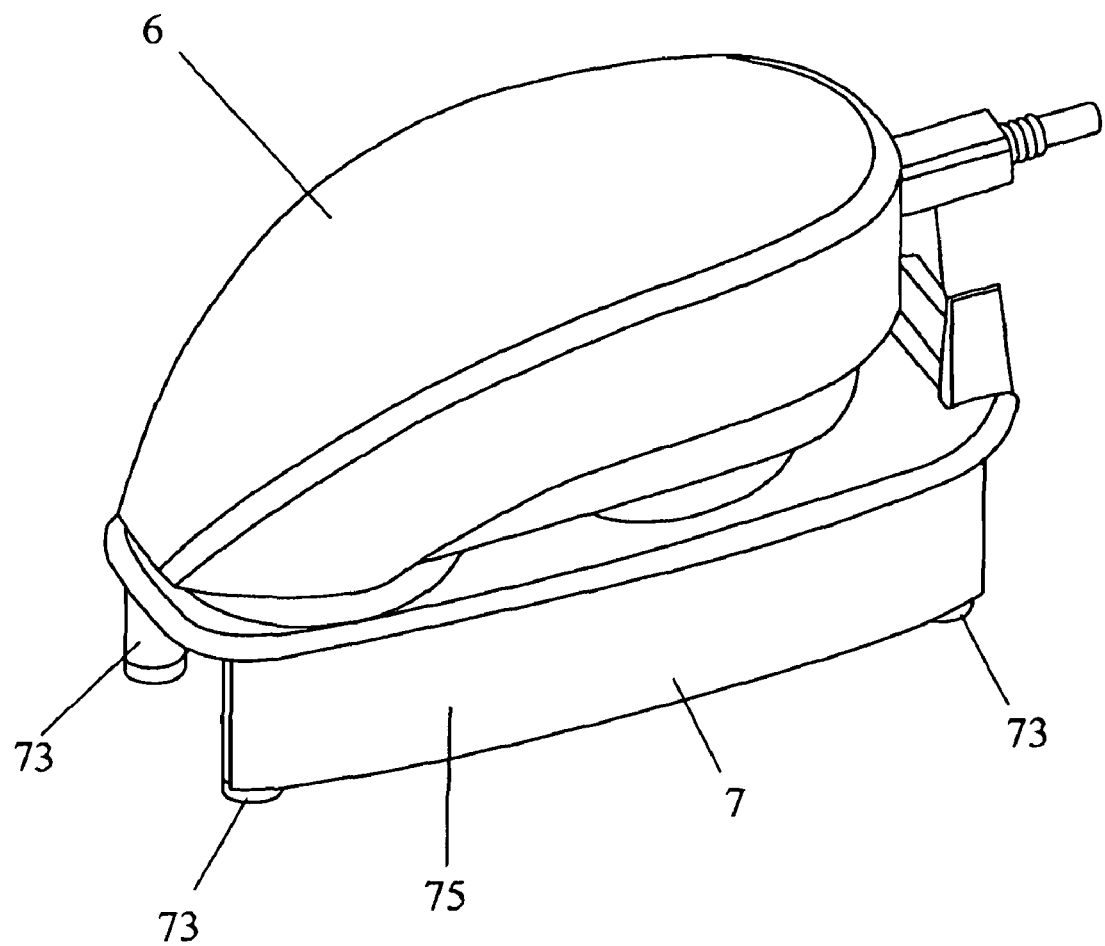
FIG. 8 is a perspective view of another example of an optical property measurement apparatus according to the present invention.
Figure 9:
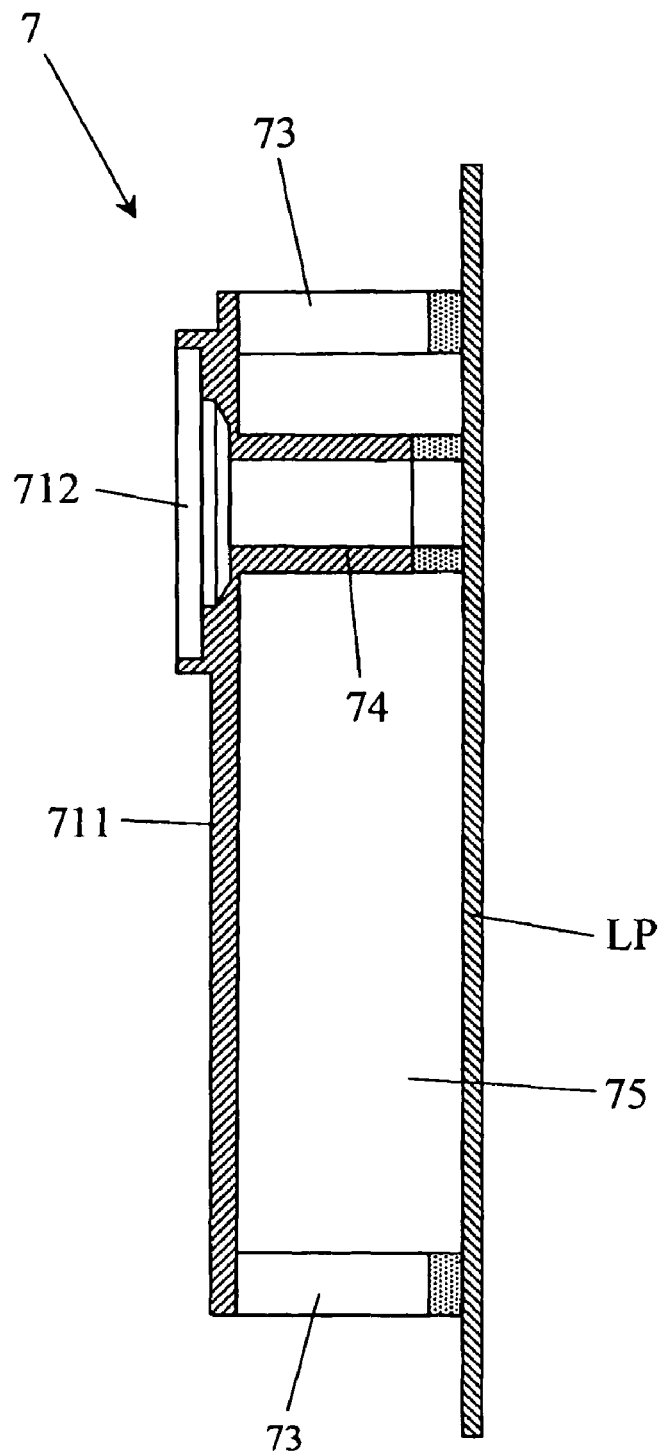
FIG. 9 is a sectional view of a measurement unit of the optical property measurement apparatus shown in FIG. 8.

Another example of the optical property measurement apparatus according to the present invention is described with reference to drawings. FIG. 8 is a perspective view of another example of the optical property measurement apparatus according to the present invention; and FIG. 9 is a sectional view of a measurement unit of the optical property measurement apparatus shown in FIG. 8. The optical property measurement apparatus shown in FIG. 8 is divisible into a measurement device 6 and a measurement unit 7. The measurement unit 7 is a member which is connected to the plane-shape surface of the measurement device 6 so as to keep a constant distance between the measurement device 6 and the surface of the liquid crystal panel LP, and includes support portions 73, a light shield portion 74 and light shield wall portions 75. The support portion 73, the light shield portion 74 and the light shield wall portion 75 have the same structures as those of the support portion 3, the light shield portion 4 and the light shield wall portion 5 shown in FIG. 3 and a detailed description is skipped.

As shown in FIG. 9, a support member 711 of the measurement unit 7 is so formed of a plane surface as to be able to come into contact with the plane-shape surface of the measurement device 6 and includes a connection portion 712 which allows an inner cylindrical space of the light shield portion 74 to so connect with a light receiving element of the measurement device 6 as to prevent light from entering. As described above, because the measurement device 6 and the measurement unit 7 are separable from each other, it is possible to use another measurement device which is capable of measuring a different optical property.

Besides, because the measurement unit 7 is so formed as to be able to engage with the plane-shape surface of the conventionally used optical property measurement apparatus, it is possible to perform accurate measurement of an optical property of a liquid crystal panel by using the conventional optical property measurement apparatus without being influenced by temperature like the measurement performed by using the optical property measurement apparatus according to the present invention.

In the above each embodiment, the optical property measurement apparatus which includes the four support portions is described. However, this is not a limitation, and a number of support portions which are capable of stabilizing the main body may be used. Besides, part or the whole of the light shield wall portion may be used as a substitute for the support portion. Here, it is preferable that a portion of the light shield wall portion which comes contact with the liquid crystal panel is provided with a cushion portion. Besides, the light shield portion may be used as one the support portions. In addition, as the light shield portion, a cylindrical light shield portion is described. However, this is not a limitation and it is possible to widely employ light shield portions which have a shape capable of shielding environmental light from entering the opening.

In the optical property measurement apparatuses according to the above embodiments, the measurement of an optical property of a liquid crystal panel of a liquid crystal display apparatus which uses the liquid crystal panel for the display portion is described as an example. However, this is not a limitation, and it is possible to measure an optical property of a display portion of an optical display apparatus whose optical property is easily changed by heat.

In the above embodiments, as the optical property to be measured, the brightness is described as an example. However, this is not a limitation, and other optical property values (e.g., brightness, contrast, gradation and the like, or a plurality of values of the optical property values including these optical property values or different ones) which indicate optical properties of the display potion may be measured.

The descriptions of the above embodiments are used to describe the present invention, and should not be construed as limitations on the scope of the present invention or reductions in the scope of the present invention. It is needless to say that the structure of each portion of the present invention is not limited to the above embodiments and various modifications are possible within the technical scope described in the claims.

The present invention is applicable to optical property measuring apparatuses capable of measuring optical properties while reducing the heat influence of self-heating or of a display portion having a heat source on the optical properties.

What is claimed is:

1. An optical property measurement apparatus that measures an optical property of a display portion of a display apparatus, comprising:

a main body which includes a plane-shape surface that is so disposed as to face a display portion;

an optical sensor which receives light entering from an opening that is formed through the plane-shape surface; and a support portion which is disposed proximate an outer perimeter of the plane-shape surface and keeps a constant distance between the display portion and the plane-shape surface; wherein a light shield portion that is so disposed as to enclose a circumferential region of an opening of the plane-shape surface and shields entrance of light from a region other than a measurement target region of the display portion, and, wherein a tip end of the light shield portion comes into contact with the surface of the display portion when an optical property of the display portion is measured with the display portion upright after the support portion contacting with the display portion.

2. The optical property measurement apparatus according to claim 1, wherein the support portion is so formed that a distance between the plane-shape surface and the display portion is larger than an inner diameter of the light shield portion at a time the optical property is measured.

3. The optical property measurement apparatus according to claim 1, wherein when the measurement of the optical property is performed, the plane-shape surface is disposed on at least one of left and right ends, and includes a light shield wall portion that shields light which passes thorough between the plane-shape surface and the display portion is disposed.

4. The optical property measurement apparatus according to claim 3, wherein the light shield wall portion is out of contact with the display portion when the measurement of the optical property is performed.

5. The optical property measurement apparatus according to claim 3, wherein part or the whole of the light shield wall portion may be used as the support portion.

6. The optical property measurement apparatus according to claim 1, wherein a distance between the plane-shape surface and the display portion is 15 mm or longer at a time the measurement of the optical property is performed.

7. The optical property measurement apparatus according to claim 1, wherein a tip end of the support portion includes a cushion portion that is capable of dispersing force by being deformed.

8. The optical property measurement apparatus according to claim 7, wherein the tip end of the light shield portion includes a cushion portion which disperses force by being deformed, and the cushion portion of the light shield portion is higher in a capability to disperse force than the cushion portion of the support portion.

9. The optical property measurement apparatus according to claim 7, wherein the tip end of the light shield portion comes into contact with the surface of the display portion when the cushion portion of the support portion is pushed against the display portion to be deformed.

10. The optical property measurement apparatus according to claim 1, wherein the tip end of the light shield portion includes a cushion portion which is capable of dispersing force by being deformed.

11. The optical property measurement apparatus according to claim 1, wherein the display portion is a liquid crystal panel.

* * * * *